United States Patent
Koyama et al.

(10) Patent No.: US 11,639,299 B2
(45) Date of Patent: May 2, 2023

(54) DRAW SOLUTE AND WATER TREATMENT EQUIPMENT

(71) Applicants: Nippon Shokubai Co., Ltd., Osaka (JP); National University Corporation Kobe University, Hyogo (JP)

(72) Inventors: Koji Koyama, Kawasaki (JP); Yuki Miyoshi, Suita (JP); Hideto Matsuyama, Kobe (JP); Asuka Inada, Kobe (JP)

(73) Assignees: Nippon Shokubai Co., Ltd., Osaka (JP); National University Corporation Kobe University, Hyogo (JP)

( * ) Notice: Subject to any disclaimer, the term of this patent is extended or adjusted under 35 U.S.C. 154(b) by 74 days.

(21) Appl. No.: 17/269,459

(22) PCT Filed: Aug. 28, 2019

(86) PCT No.: PCT/JP2019/033777
§ 371 (c)(1),
(2) Date: Feb. 18, 2021

(87) PCT Pub. No.: WO2020/045525
PCT Pub. Date: Mar. 5, 2020

(65) Prior Publication Data
US 2021/0253450 A1    Aug. 19, 2021

(30) Foreign Application Priority Data
Aug. 31, 2018 (JP) ................ JP2018-162688

(51) Int. Cl.
*C02F 1/44* (2006.01)
*C08L 79/02* (2006.01)

(52) U.S. Cl.
CPC ............ *C02F 1/445* (2013.01); *C08L 79/02* (2013.01)

(58) Field of Classification Search
None
See application file for complete search history.

(56) References Cited

U.S. PATENT DOCUMENTS

| 5,759,409 A | * | 6/1998 | Knauf | .............. B01D 17/047 516/178 |
| 7,431,845 B2 | | 10/2008 | Manek et al. | |
| 7,736,525 B2 | * | 6/2010 | Thankachan | .......... C08L 79/02 528/424 |

(Continued)

FOREIGN PATENT DOCUMENTS

| EP | 3130398 A1 | 2/2017 |
| JP | 2013-194240 A | 9/2013 |

(Continued)

OTHER PUBLICATIONS

Mimons, Masters Thesis, Wright State UNiversity (Year: 2007).*

(Continued)

*Primary Examiner* — Krishnan S Menon
(74) *Attorney, Agent, or Firm* — Morgan, Lewis & Bockius LLP

(57) ABSTRACT

A draw solute for forward osmosis membrane process, comprising an addition polymer obtained by addition polymerization of an alkylene oxide having 2 to 10 carbon atoms to an amine compound.

6 Claims, 8 Drawing Sheets

(56) References Cited

U.S. PATENT DOCUMENTS

| | | | |
|---|---|---|---|
| 8,168,005 B2* | 5/2012 | Borne | C11D 1/83 |
| | | | 510/421 |
| 9,399,193 B2* | 7/2016 | Kim | C08F 220/54 |
| 9,738,754 B2 | 8/2017 | Ebert et al. | |
| 10,589,232 B2* | 3/2020 | Morita | B01D 71/44 |
| 11,241,655 B2* | 2/2022 | Hu | B01D 61/005 |
| 2004/0176499 A1 | 9/2004 | Herrmann et al. | |
| 2006/0011544 A1* | 1/2006 | Sharma | B01D 61/56 |
| | | | 210/651 |
| 2016/0016115 A1* | 1/2016 | Wilson | B01D 61/005 |
| | | | 210/644 |
| 2017/0182477 A1* | 6/2017 | Fuchigami | B01D 61/005 |
| 2018/0015414 A1* | 1/2018 | Hu | B01D 61/025 |
| 2018/0051416 A1* | 2/2018 | Lu | D21H 23/10 |
| 2018/0272286 A1* | 9/2018 | Gronwald | B01D 69/02 |
| 2020/0071265 A1* | 3/2020 | Dhawan | C09K 8/584 |
| 2021/0237004 A1* | 8/2021 | Nakagawa | B01D 71/022 |
| 2021/0268438 A1* | 9/2021 | Nishiura | C08F 16/18 |
| 2021/0316250 A1* | 10/2021 | Osato | B01D 61/005 |
| 2021/0379534 A1* | 12/2021 | Nakao | B01D 63/065 |

FOREIGN PATENT DOCUMENTS

| | | |
|---|---|---|
| JP | 2014-100692 A | 6/2014 |
| JP | 2016-087504 A | 5/2016 |
| JP | 2016-190228 A | 11/2016 |
| JP | 2017-025834 A | 2/2017 |
| JP | 2017-148724 A | 8/2017 |
| JP | 6172385 B2 | 8/2017 |
| WO | 2013/036111 A1 | 3/2013 |
| WO | 2015/156404 A1 | 10/2015 |
| WO | 2017/038402 A1 | 3/2017 |
| WO | 2017/136048 A1 | 8/2017 |
| WO | 2018/150690 A1 | 8/2018 |

OTHER PUBLICATIONS

Polyethyleneimine ethoxylate, Nippon Shokubai, commercial catalogue web site (Year: 2022).*

Extended European Search Report issued in counterpart European Patent Application No. 19855317.4 dated May 27, 2022.

International Preliminary Report on Patentability and Written Opinion issued in corresponding International Patent Application No. PCT/JP2019/033777 dated Mar. 11, 2021.

International Search Report issued in corresponding International Patent Application No. PCT/JP2019/033777 dated Nov. 19, 2019.

* cited by examiner

DRAW SOLUTE AND WATER TREATMENT EQUIPMENT

TECHNICAL FIELD

The present invention relates to a draw solute and water treatment equipment using the same.

BACKGROUND ART

A forward osmosis membrane process utilizes a phenomenon in which a solvent moves from the side with lower osmotic pressure to the side with higher osmotic pressure by bringing two solutions having different concentrations into contact with each other via a semipermeable membrane, and can be utilized for the separation of the components of the solution, and the like. As compared with a reverse osmosis membrane process in which a pressure is applied to a solution against the osmotic pressure to force the solution to pass through a membrane, the forward osmosis membrane process that performs membrane filtration by utilizing the osmotic pressure is easy to save energy and is expected to be applied to water treatment such as desalination of sea water and electricity generation.

When water treatment is performed by using the forward osmosis membrane process, a solution that has higher osmotic pressure (draw solution) than a solution to be subjected to the treatment (solution to be treated) is used to move a solvent (water) from the side of the solution to be treated to the side of the draw solution through a semipermeable membrane. Since the solvent needs to be collected from the draw solution thereafter, the draw solution needs to have properties that allow to separate the solvent easily and thus various osmotic pressure inducers (draw solutes) for preparing such a draw solution are examined. For example, it is proposed in Patent Literature 1 that "a block copolymer having a glycerin structure as a basic structure and including an ethylene oxide group as a hydrophilic group and a group consisting of propylene oxide and/or butylene oxide as a hydrophobic group" is used as a temperature-sensitive absorbent (draw solute).

CITATION LIST

Patent Literature

[Patent Literature 1] Japanese Patent No. 6172385

SUMMARY OF INVENTION

Technical Problem

Incidentally, in view of expanding the scope of application of the forward osmosis membrane process to various technologies in the future, it is preferable to increase a variation of draw solutes so that an optimal draw solution can be selected depending on process.

Then, an object of the present invention is to provide a draw solute that can be suitably used in a forward osmosis membrane process and water treatment equipment using the draw solute.

Solution to Problem

As a result of intensive studies in view of the above circumstances, the present inventors have completed the inventions shown in [1] to [6] below.

[1] A draw solute for forward osmosis membrane process, comprising an addition polymer obtained by addition polymerization of an alkylene oxide having 2 to 10 carbon atoms to an amine compound.
[2] The draw solute according to [1], wherein the amine compound is polyethyleneimine.
[3] The draw solute according to [2], wherein the weight average molecular weight of the polyethyleneimine is 100 to 5000.
[4] The draw solute according to any one of [1] to [3], wherein the average number of moles added of the alkylene oxide in the addition polymer is 0.5 to 10.
[5] A draw solution comprising the draw solute according to any one of [1] to [4].
[6] Water treatment equipment using the draw solution according to [5].

Advantageous Effects of Invention

According to the present invention, the draw solute that can be suitably used in a forward osmosis membrane process and water treatment equipment using the draw solute can be provided.

DESCRIPTION OF EMBODIMENTS

Figure 1:
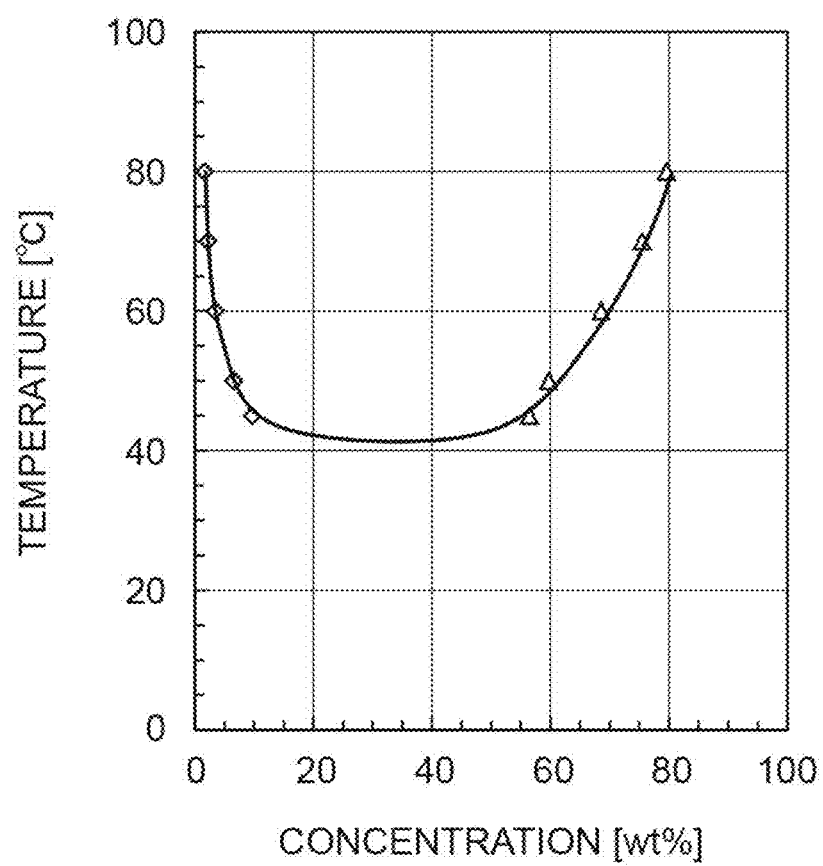
FIG. 1 is a graph showing the evaluation results of the compound of Example 3 in evaluation 1 in Examples.

Hereinafter, an embodiment of the present invention will be described in detail, but the present invention is not limited thereto.

<Draw Solute>

The draw solute of the present embodiment comprises an addition polymer obtained by addition polymerization of an alkylene oxide having 2 to 10 carbon atoms to an amine compound. The addition polymer has a structure in which a polyoxyalkylene chain derived from an alkylene oxide is bonded to the nitrogen atom in the amino group in the amine compound. The addition polymer contained in the draw solute may be only one type of addition polymer or two or more types of addition polymers.

The amine compound is not particularly limited as long as it has an amino group to which an alkylene oxide can be added, that is, it has a primary amino group or a secondary amino group, and examples thereof include polyethyleneimine, ethylenediamine, diethylenetriamine, triethylenetetramine, polyamide polyamine obtained by condensation of a polyamine such as ethylenediamine and a polybasic acid such as an adipic acid, and morpholine. Among them, polyethyleneimine is preferable.

Polyethyleneimine comprises a plurality of structural units derived from ethyleneimine. The structural units derived from ethyleneimine can be represented by a formula —N(—Z)—CH$_2$CH$_2$—. In the formula, Z represents a hydrogen atom, a unit derived from an alkylene oxide, a unit derived from ethyleneimine, or the like. Meanwhile, structural units derived from alkylene oxides can be represented by a formula —CH(—R)CH(—R')—O—. In the formula, R and R' each independently represent a hydrogen atom or an alkyl group having 1 to 8 carbon atoms, provided that the sum of the number of carbon atoms of the alkyl groups in R and R' is 8 or less.

Examples of polyethyleneimine include, but are not particularly limited to, linear or branched polyethyleneimine, and for example, diethylenetriamine, Epomin SP-003, SP-006, SP-012, and SP-018 (manufactured by NIPPON SHOKUBAI CO., LTD.), and Lupasol G20 and G35 (manufactured by BASF) can be suitably used.

The weight average molecular weight of polyethyleneimine is preferably 100 to 5000, more preferably 150 to 3000, and further preferably 200 to 2000. As used herein, "the weight average molecular weight" refers to the weight average molecular weight determined by GPC (gel permeation chromatography) measurement under the following conditions.

Measurement equipment: HLC-8120GPC (trade name, manufactured by Tosoh Corporation)

Molecular weight column: TSK-GEL GMHXL-L and TSK-GELG5000HXL (both are manufactured by Tosoh Corporation) connected in series are used Eluent: tetrahydrofuran (THF)

Standard substance for calibration curve: polystyrene (manufactured by Tosoh Corporation)

Measurement method: The object to be measured is dissolved in THF so that the solid content is about 0.2% by mass and a product obtained by filtering the mixture through a filter is used as a measurement sample to measure the molecular weight thereof.

The amine number of polyethyleneimine is not particularly limited, and may be, for example, 5 to 40 mmol/g. solid).

The alkylene oxide having 2 to 10 carbon atoms is not particularly limited, but alkylene oxides having 2 to 4 carbon atoms such as ethylene oxide (EO), propylene oxide (PO), and butylene oxide (BO) are preferable. One type of alkylene oxide may be subjected to addition polymerization, or two or more types of alkylene oxides in combination may be subjected to addition polymerization. The addition polymerization may be block polymerization, random polymerization, or in combination of them.

The average number of moles added of alkylene oxide in the above addition polymer is preferably 0.5 to 20 moles, more preferably 0.5 to 10 moles, further preferably 0.8 to 8 moles, and particularly preferably 1 to 6.5 moles per 1 mole of the nitrogen atom contained in the amine compound (in particular, polyethyleneimine).

In the above addition polymer, it is preferable that the mass ratio of the structural units derived from amine compounds (in particular, polyethyleneimine) to the structural units derived from alkylene oxides (the mass of the structural units derived from amine compounds/the mass of the structural units derived from alkylene oxides) be 0.1 or more and 2 or less.

In the above addition polymer, it is preferable that two or more alkylene oxides be subjected to addition polymerization. The combination of two or more alkylene oxides to be subjected to addition polymerization is preferably a combination of EO and PO, a combination of EO and BO, a combination of PO and BO, or a combination of EO, PO, and BO, more preferably a combination of EO and PO, a combination of EO and BO, or a combination of PO and BO, and further preferably a combination of EO and BO.

When two alkylene oxides (for example, EO and BO) are subjected to addition polymerization, the mole ratio of two alkylene oxides in the above addition polymer is, for example, preferably 9:1 to 1:9, more preferably 8:2 to 2:8, and further preferably 6:4 to 4:6.

The reaction conditions when the alkylene oxide is subjected to addition polymerization (alkoxylation) with the amine compound are not particularly limited, and for example, the amine compound and the alkylene oxide may be used as they are or, if necessary, diluted with a solvent, and may be preferably reacted at 0 to 200° C., and more preferably at 120 to 180° C. At this time, alkali catalysts such as potassium hydrate (KOH) and sodium hydroxide (NaOH) may be used as a catalyst. For example, the reaction can be performed by adding a catalyst to the amine compound, and further feeding a polyalkylene oxide into the reaction system. When two or more polyalkylene oxides are subjected to addition polymerization, they may be fed after mixed, or they may be separately fed. When two or more polyalkylene oxides are separately fed, they may be simultaneously fed or sequentially fed. Moreover, the reaction rate can be more increased by aging them 1 to 2 hours until they are sufficiently reacted after feeding the alkylene oxide.

After the reaction, it is preferable that acids such as acetic acid be added for neutralization to remove light impurities such as 2,3-butadione contained in the addition polymer under reduced pressure at 120 to 200° C., and more preferably 140 to 180° C.

<Draw Solution>

The draw solution of the present embodiment comprises the above draw solute. The content of the draw solute is preferably 20 to 100% by mass, more preferably 50 to 100% by mass, and further preferably 75 to 100% by mass based on the total amount of the draw solution.

The above draw solution may comprise a solvent. The solvent may be appropriately selected depending on the conditions of the forward osmosis membrane process using the draw solution, and one or two or more solvents selected from water, methanol, ethanol, and the like can be used. It is more preferable to comprise the same solvent as the solvent to be treated. The content of the solvent may be, for example, 80 to 0% by mass based on the total amount of the draw solution.

The above draw solution may comprise draw solutes other than the above draw solute (other draw solutes), but it is preferable that the content thereof be 20% by mass or less based on the total amount of the draw solute. It is preferable that the draw solution be comprised of the above draw solute, optional solvents, and optional other draw solutes, and it is more preferable that the draw solution be comprised of the above draw solute and solvent.

It is preferable that the above draw solution have a cloud point (lower critical solution temperature). The cloud point means a temperature at which phase separation is caused by changing the temperature of a transparent or translucent liquid, resulting in an opaque liquid. The draw solution having a cloud point can cause phase separation between the draw solute and the solvent by heating.

The cloud point of above draw solution can be appropriately adjusted by changing the configuration of the above addition polymer, for example, the structure of the amine compound, the type and the number of moles added of the alkylene oxide, and the like, and a draw solution having an appropriate cloud point can be selected according to the intended use.

For example, when the forward osmosis membrane process is applied to the water treatment utilizing the low-temperature waste heat from factories, it is preferable that the draw solution be not phase separated at a temperature around room temperature at which forward osmosis membrane treatment is performed and the draw solution be phase separated at a temperature of approximately low-temperature waste heat from factories. Suitable cloud points of the draw solution used in such applications vary depending on the concentration of the draw solute in the draw solution, and for example, it is preferably 35 to 80° C., and more preferably 40 to 75° C.

Since the low-temperature waste heat from factories has conventionally been difficult to utilize and a large part of that has resulted in waste heat, the water treatment using the low-temperature waste heat is particularly preferable from the viewpoint of energy efficiency.

<Forward Osmosis Membrane Process>

In the forward osmosis membrane process, a feed solution (solution to be treated) and a draw solution are brought into contact via a semipermeable membrane, and the solvent moves from the side of the feed solution with lower osmotic pressure to the side of the draw solution with higher osmotic pressure. Along with the movement of the solvent, the concentration of the draw solution gradually decreases. Therefore, the draw solute and the solvent contained in the draw solution need to be separated in order to continuously perform the forward osmosis membrane process.

By using the above draw solution having a cloud point, the draw solute and the solvent can be phase separated by heating.

In the forward osmosis membrane process using such a draw solution having a cloud point, for example, the forward osmosis membrane process can be continuously performed by repeating the following treatments.

Each of the feed solution and the draw solution is arranged on one side of the semipermeable membrane and on the other side thereof so as to contact with the semipermeable membrane, thereby moving the solvent from the side of the feed solution to the side of the draw solution through the semipermeable membrane.

The draw solution whose concentration is decreased is taken out and heated to cause phase separation between the draw solute and the solvent.

The draw solute obtained by phase separation is circulated to the above other side again.

The solvent obtained by phase separation is further purified by using, for example, a nanofiltration membrane (NF membrane) to obtain a desired treated object (purified water, and the like).

As another method, a method for phase separating a draw solute and a solvent by allowing the solvent to pass through a membrane from the side of the feed solution to the side of the draw solution using a draw solution in which compatibility with the solvent is increased by allowing the draw solute to absorb an acid gas and thereafter removing the acid gas from the draw solute can also be applied.

Examples of the above acid gas include carbon oxides such as carbon monoxide and carbon dioxide; sulfur oxides such as sulfur monoxide, sulfur dioxide and sulfur trioxide; and oxides of nitrogen such as nitric oxide, nitrogen dioxide, nitrous oxide, dinitrogen trioxide, dinitrogen tetraoxide, and dinitrogen pentaoxide. Among them, it is preferable that the above acid gas be carbon dioxide.

The temperature at which the above forward osmosis membrane treatment is performed is not particularly limited, but it is usually around room temperature and may be, for example, 5 to 40° C.

As the semipermeable membrane (membrane) used for the forward osmosis membrane process, a conventionally known membrane can be used, and it is preferable to be used as a combination with a dense active layer that determines the selective permeability of the membrane and a porous support layer to maintain the strength of the membrane. Since the support layer is more likely to adsorb the contamination than the active layer, in general, it is preferable that the active layer of a semipermeable membrane be provided on the side of the feed solution (water to be treated) from the viewpoint of reducing the membrane fouling (see FIG. 7).

The above draw solution can be applied to various applications utilizing the forward osmosis membrane process. Among them, water treatment equipment and electricity generation equipment are applications which are expected to utilize the forward osmosis membrane process and the above draw solution can be suitably applied to these applications.

EXAMPLES

Hereinafter, the present invention will be described further in detail by way of Examples, but the present invention is not limited to these Examples. Unless otherwise specified, "%" means "% by mass".

Examples 1 to 10

To 100 g of polyethyleneimine having an average molecular weight of 600 (manufactured by NIPPON SHOKUBAI CO., LTD., trade name "Epomin (R) SP-006", amine number: 20 mmol/g. solid), 16 g of 50% KOH was added and the mixture was heated to 125° C. in a 1.2 L autoclave under a nitrogen atmosphere. Thereafter, dehydration under reduced pressure was performed to remove water in the reaction system. Then, ethylene oxide (EO) was fed thereto in an amount added shown in Table 1 to add ethylene oxide to polyethyleneimine. Similarly, 330 g of butylene oxide (BO) was fed thereto in an amount added shown in Table 1 to further add butylene oxide. The mixture was cooled to 80° C. and 12 g of 68% acetic acid was added thereto for neutralization, followed by reducing the pressure to 0.005 MPa or less while bubbling nitrogen at a flow rate of 20 ml/min, degassing at 120° C. for 1 hour to remove light impurities, thereby obtaining a desired compound (addition polymer).

The obtained compound was dissolved in water to prepare a 2% aqueous solution and a 40% aqueous solution, and evaluation of cloud points (Cp) was performed. Specifically, when the temperature of the aqueous solution was increased, the temperature at which phase separation was caused and the aqueous solution became opaque was evaluated as the cloud point (Cp). The results are shown in Table 1.

TABLE 1

|  | Amount added of EO (g) | Amount added of BO (g) | Average EO amount added (mol) | Average BO amount added (mol) | Cp [2% aq] (° C.) | Cp [40% aq] (° C.) |
|---|---|---|---|---|---|---|
| Example 1 | 350 | 165 | 3.4 | 1 | 76 | 69 |
| Example 2 |  | 330 |  | 2 | 24 | 25 |
| Example 3 | 450 |  | 4.4 | 2 | 40 | 41 |
| Example 4 | 0 | 100 | — | 0.6 | 67 | 64 |
| Example 5 |  | 135 |  | 0.8 | 45 | 34 |
| Example 6 | 50 | 85 | 0.5 | 0.5 | 67 | 78 |
| Example 7 | 20 | 135 | 0.2 | 0.8 | 39 | 33 |
| Example 8 | 35 |  |  | 0.35 | 41 | 35 |
| Example 9 | 60 |  |  | 0.6 | 44 | 40 |
| Example 10 | 120 |  |  | 1.2 | 53 | 65 |

As can be seen from Table 1, the cloud points of 2% aqueous solutions and 40% aqueous solutions of the compounds of Examples 1 to 10 are about 20 to 80° C., and thus it has been found that they are suitable as a draw solute.

Comparative Example

A compound of Comparative Example (glycerol ethoxylate (butoxylated)) was obtained in a similar manner as GE1000-BBB (A5) described in Japanese Patent No. 6172385.

<Evaluation>

The following evaluations 1 to 3 were performed for the compounds of Examples 3 and 9 and Comparative Example.

(Evaluation 1: Generation of Phase Diagram)

An aqueous solution containing about 50% of the above compound was prepared and sealed in a screw vial. This was allowed to stand in a thermostatic bath having a predetermined temperature and allowed to reach equilibrium sufficiently, and then each of the upper phase (organic rich phase) and the lower phase (water rich phase) were taken out by syringe. The amount of water in the organic rich phase and the amount of organic matter in the water rich phase of each sample were respectively measured by a hybrid Karl Fischer moisture titrator (MKH-700, manufactured by KYOTO ELECTRONICS MANUFACTURING CO., LTD.) and a total organic carbon analyzer (TOC-VCSH, SHIMADZU CORPORATION). Measurements were performed 3 to 5 times and the average value thereof was determined as the measured value. The weight percentage of the solute was calculated from the thus determined amount of water or organic matter, and plotted with respect to the equilibrium temperature.

Figure 2:
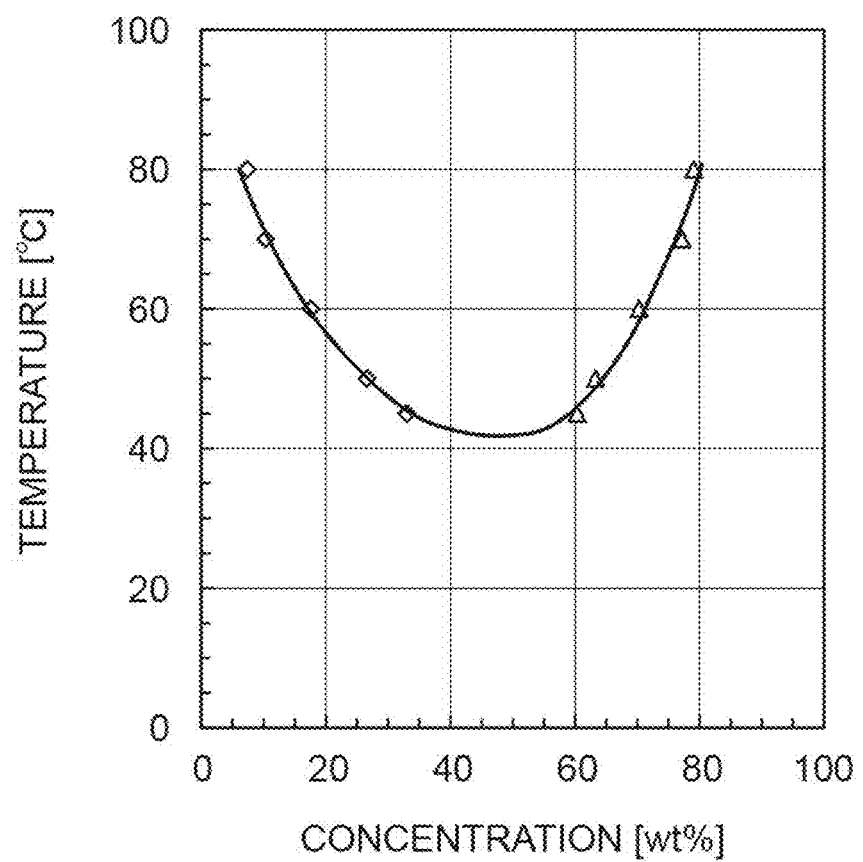
FIG. 2 is a graph showing the evaluation results of the compound of Example 9 in evaluation 1 in Examples.
Figure 3:
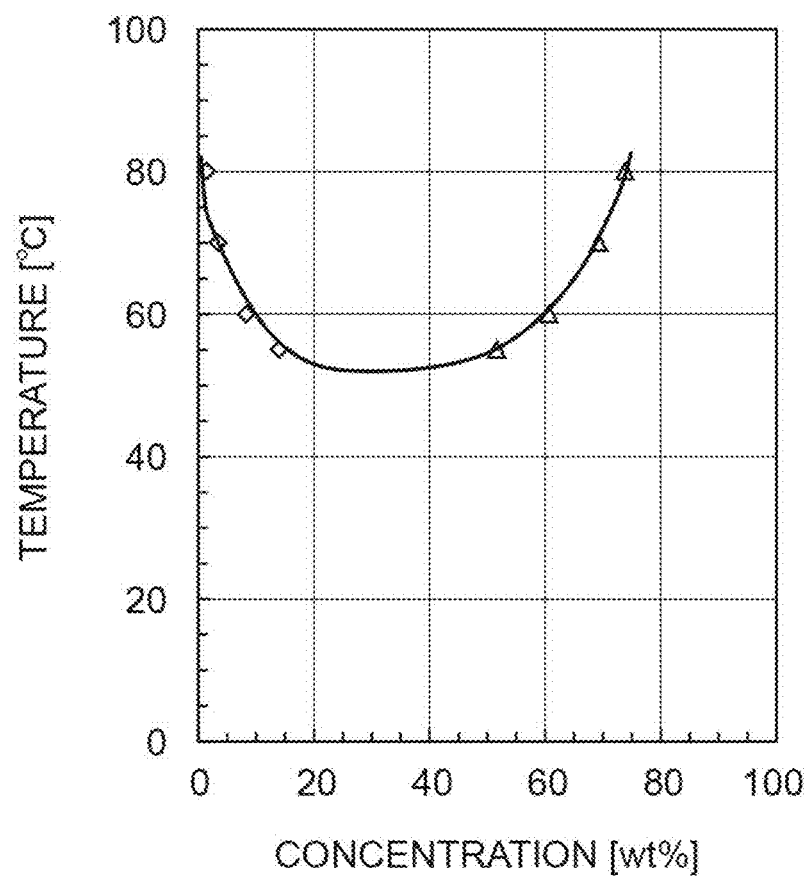
FIG. 3 is a graph showing the evaluation results of the compound of Comparative Example in evaluation 1 in Examples.

The phase diagram of the compound of Example 3, the phase diagram of the compound of Example 9, and the phase diagram of the compound of Comparative Example are shown in FIG. 1, FIG. 2, and FIG. 3, respectively.

When the compounds of Examples 3 and 9 shown in FIGS. 1 and 2 are used, the concentrations of both compounds in the organic rich phase in the case of separating at 80° C. are both as high as about 80%. On the other hand, when the compound of Comparative Example shown in FIG. 3 is used, the concentration of the compound in the organic rich phase in the case of separating at 80° C. is slightly low of 75%. A high concentration of the compound in the organic rich phase is preferable because it means an increase in the amount of the compound which can be separately collected.

(Evaluation 2: Osmotic Pressure Measurement)

Aqueous solutions of the above compounds having the concentration of 5 to 95% were prepared. About 7 ml of aqueous solution samples were transferred to dedicated sample cups and the water activity at 25° C. of respective aqueous solutions were measured by using a water activity measuring equipment (AquaLab Series4 TDL). Measurement was performed 3 to 5 times and the average value thereof was determined as the measured value of water activity. The osmotic pressure (bar) was calculated by the expression and by unit conversion of the determined measured value of water activity and plotted with respect to the charge concentration.

Figure 4:
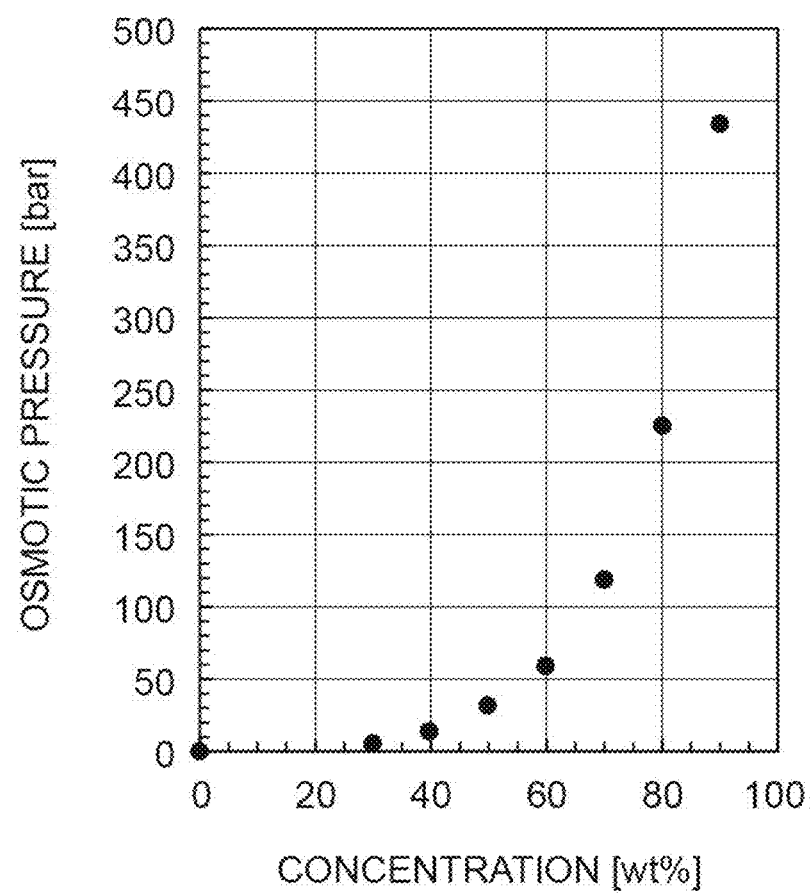
FIG. 4 is a graph showing the evaluation results of the compound of Example 3 in evaluation 2 in Examples.
Figure 5:
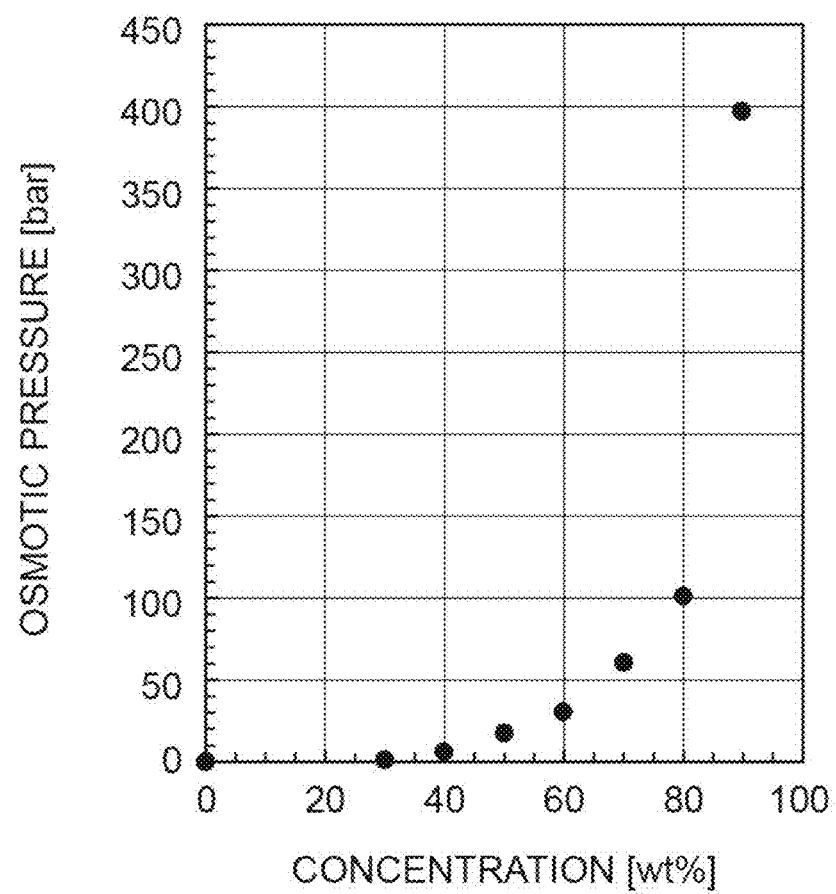
FIG. 5 is a graph showing the evaluation results of the compound of Example 9 in evaluation 2 in Examples.
Figure 6:
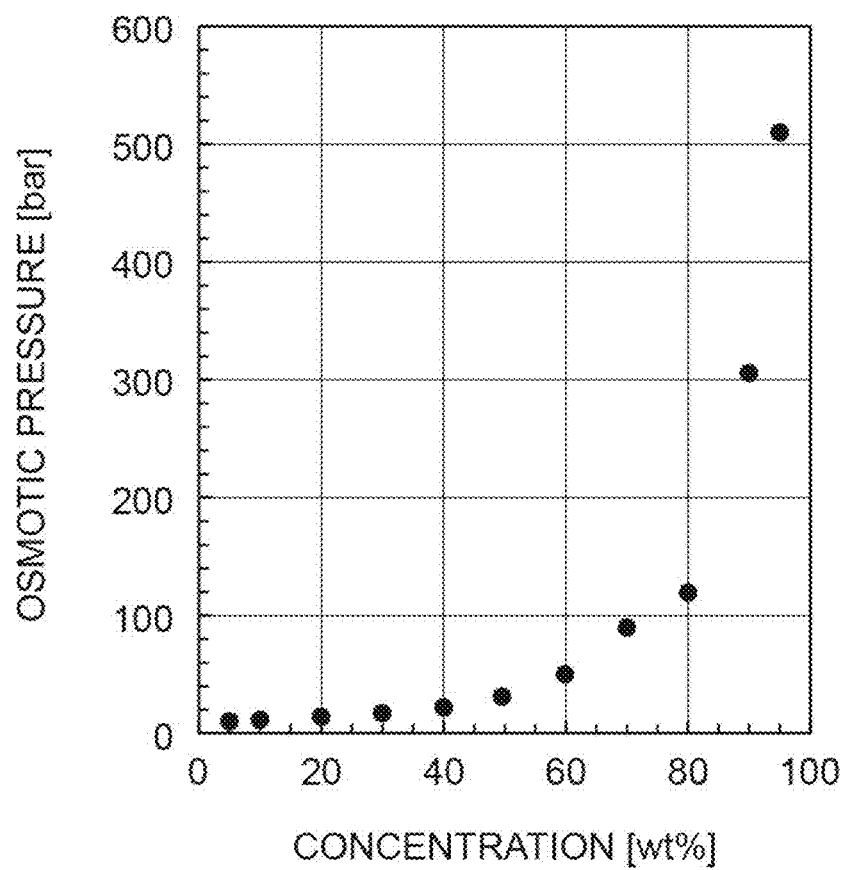
FIG. 6 is a graph showing the evaluation results of the compound of Comparative Example in evaluation 2 in Examples.

The evaluation results of the compound of Example 3, the evaluation results of the compound of Example 9, and the evaluation results of the compound of Comparative Example are shown in FIG. 4, FIG. 5, and FIG. 6, respectively.

When the compound of Example 3 shown in FIG. 4 is used, the osmotic pressure at a concentration of 80% is about 225 bar, which is very high. On the other hand, when the compound of Example 9 and the compound of Comparative Example shown in FIGS. 5 and 6, respectively, are used, the osmotic pressure at a concentration of 30% is about 100 bar and equivalent to each other. The higher osmotic pressure at the same concentration enables the water to pass through a forward osmosis membrane more easily, and thus is preferable.

(Evaluation 3: Forward Osmosis Membrane Water Permeation Test)

Figure 7:
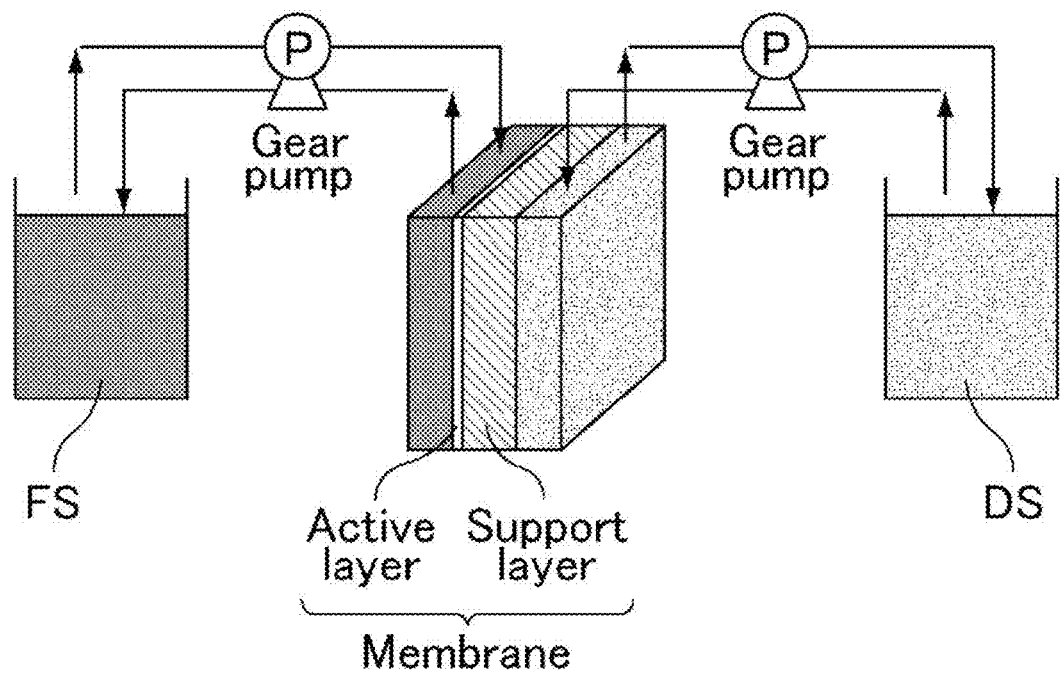
FIG. 7 is a diagram of the equipment used in evaluation 3 in Examples.

A forward osmosis membrane made of cellulose triacetate (manufactured by FTS) was used to perform a forward osmosis membrane water permeation test. The diagram of the equipment for forward osmosis membrane water permeation test is shown in FIG. 7. The water permeation test was performed by using about 500 g of ultrapure water as the feed solution (FS), about 50 g of the 47.8% aqueous solution of the compound of Example 3 or 46.5% aqueous solution of the compound of Comparative Example as the draw solution (DS) for 60 minutes at AL-FS mode (FS is in contact with the side of the active layer of the forward osmosis membrane). The change over time of the FS mass when FS and DS were cyclically supplied to a cell at about 0.5 L/min was recorded and water flux (Jw) was calculated by using the following expression (1). In the following expression (1), Δw represents the amount of volume change of the feed solution, Am represents the effective membrane area, and Δt represents the time of the forward osmosis membrane water permeation test. The results are shown in FIG. 8.

[Expression 1]

$$Jw = \frac{\Delta w}{A_m \Delta t \times 1000} \quad (1)$$

Figure 8:
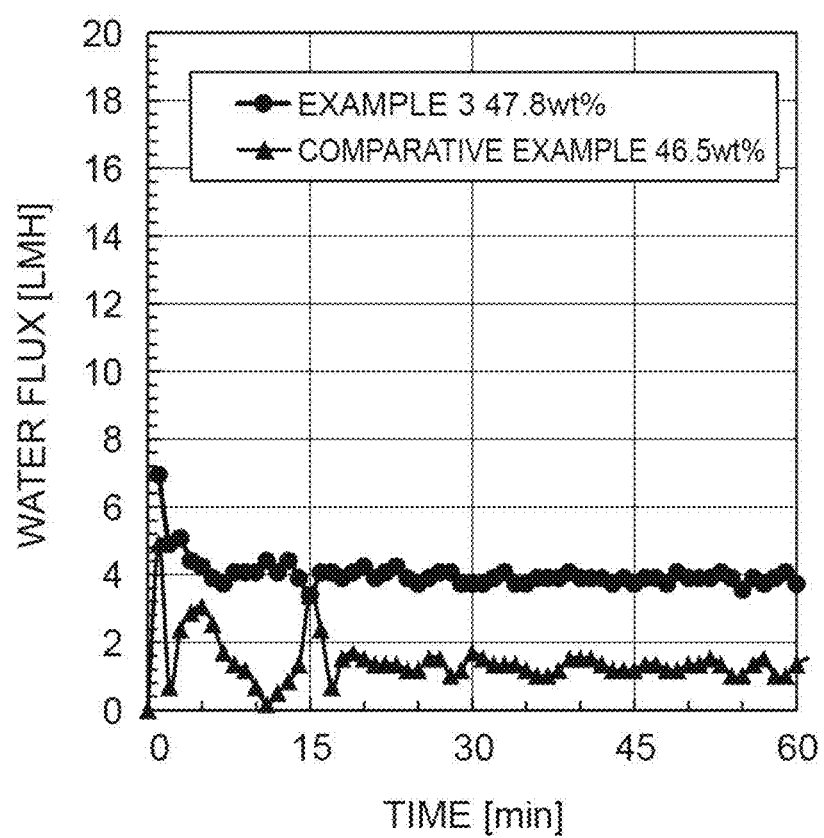
FIG. 8 is a graph showing the evaluation results of evaluation 3 in Examples.

As can be seen from FIG. 8, in the case of using the compound of Example 3, the water permeability is two or more times higher than that in the case of using the compound of Comparative Example.

Example 11

To 100 g of polyethyleneimine having an average molecular weight of 300 (manufactured by NIPPON SHOKUBAI CO., LTD., trade name "Epomin (R) SP-003"), 16 g of 50% KOH was added, and the mixture was heated to 125° C. in a 1.2 L autoclave under a nitrogen atmosphere. Thereafter, dehydration under reduced pressure was performed to remove the water in the reaction system. Then, 450 g of ethylene oxide (EO) was fed thereto to add ethylene oxide to polyethyleneimine. Similarly, 330 g of butylene oxide (BO) was fed thereto to further add butylene oxide. The mixture was cooled to 80° C. and 12 g of 68% acetic acid was added thereto for neutralization, followed by reducing the pressure to 0.005 MPa or less while bubbling nitrogen at a flow rate of 20 ml/min, degassing at 120° C. for 1 hour to remove light impurities, thereby obtaining a desired compound (addition polymer) (average EO amount added: 4.4 mol, average BO amount added: 2.0 mol).

When a 2% aqueous solution and a 40% aqueous solution were prepared with respect to the obtained addition polymer in the same manner as Examples 1 to 10 and evaluation of the cloud point (Cp) was performed, Cp [2% aq] and Cp [40% aq] were 43° C. and 44° C., respectively.

Example 12

To 100 g of diethylene triamine, 16 g of 50% KOH was added, and the mixture was heated to 125° C. in a 1.2 L autoclave under a nitrogen atmosphere. Thereafter, dehydration under reduced pressure was performed to remove the water in the reaction system. Then, 945 g of ethylene oxide (EO) was fed thereto to add ethylene oxide to polyethyleneimine. Likewise, 525 g of butylene oxide (BO) was fed thereto to further add butylene oxide. The mixture was cooled to 80° C., and 12 g of 68% acetic acid was added thereto for neutralization, followed by reducing the pressure to 0.005 MPa or less while bubbling nitrogen at a flow rate of 20 ml/min, degassing at 120° C. for 1 hour to remove light impurities, thereby obtaining a desired compound (addition polymer) (average EO amount added: 7.3 mol, average BO amount added: 2.5 mol).

With respect to the obtained addition polymer, a 2% aqueous solution and a 40% aqueous solution were prepared in the same manner as Examples 1 to 10, and evaluation of the cloud point (Cp) was performed, Cp [2% aq] and Cp [40% aq] were 64° C. and 67° C., respectively.

Example 13

A desired compound (addition polymer) was obtained in the same manner as Example 12 except that the amount fed of butylene oxide (BO) was changed to 700 g (average EO amount added: 7.3 mol, average BO amount added: 3.3 mol).

With respect to the obtained addition polymer, a 2% aqueous solution and a 40% aqueous solution were prepared in the same manner as Examples 1 to 10, and evaluation of the cloud point (Cp) was performed, Cp [2% aq] and Cp [40% aq] were 40° C. and 42° C., respectively.

The invention claimed is:

1. A forward osmosis membrane process for water treatment comprising contacting a water feed solution and a draw solution with a semipermeable membrane, wherein the draw solution comprises an addition polymer obtained by addition polymerization of an alkylene oxide having 2 to 10 carbon atoms to an amine compound and a solvent.

2. The forward osmosis membrane process according to claim 1, wherein the amine compound is polyethyleneimine.

3. The forward osmosis membrane process according to claim 2, wherein a weight average molecular weight of the polyethyleneimine is 100 to 5000.

4. The forward osmosis membrane process according to claim 1, wherein an average number of moles added of the alkylene oxide in the addition polymer is 0.5 to 10 per mole of nitrogen in the amine compound.

5. The forward osmosis membrane process according to claim 2, wherein an average addition molar number of the alkylene oxide in the addition polymer is 0.5 to 10 per mole of nitrogen in the amine compound.

6. The forward osmosis membrane process according to claim 3, wherein an average addition molar number of the alkylene oxide in the addition polymer is 0.5 to 10 per mole of nitrogen in the amine compound.

\* \* \* \* \*